Aug. 7, 1956 — W. E. PARKES ET AL — 2,757,409
CUTTING HEAD FOR SAUSAGE PEELING MACHINES
Filed Jan. 20, 1954

INVENTORS
Walter E. Parkes
William W. Parkes
BY
Murray, Sackhoff & Murray
ATT'YS United States Patent Office 2,757,409
Patented Aug. 7, 1956

2,757,409

CUTTING HEAD FOR SAUSAGE PEELING MACHINES

Walter E. Parkes, Deer Park, and William W. Parkes, Sycamore Township, Hamilton County, Ohio, assignors to Theodore B. Cline, Cincinnati, Ohio Application January 20, 1954, Serial No. 405,137

2 Claims. (Cl. 17—1)

The present invention relates to improvements in the cutting heads for machines for peeling foreign casings from sausages, such as from the product popularly referred to as the "skinless frankfurter."

Machines of the foregoing character, per se, are well known but heretofore, in so far as we can determine, the problem of providing these machines with a cutting head that will perform the same under all working conditions to produce a satisfactory product has remained unsolved. Specifically we found that the temperature and moisture conditions in the various meat packing plants using these machines varied widely, as did the consistency of the sausage material and the foreign casing which are both dependent, to some extent, on circumambient temperature and moisture conditions. Thus a machine that had performed satisfactorily in one plant would continually break down in another plant due to the failure of the cutting head to adapt itself to various plant and product conditions. Some machines could be adjusted within narrow limits to oercome the non-cutting fault but these machines would then produce a relatively large number of damaged frankfurters with nozzle cuts and streak marks therein requiring that they be discarded as culls.

It is therefore the main object of this invention to provide in a machine of the foregoing character a cutting head which will have a dependable and positive casing slitting action that will operate satisfactorily under all working conditions.

Another object of the invention is to provide a cutting head that will be sturdy and durable in construction, may be readily cleaned without damage to the moving parts thereof, positively reliable and efficient in operation and relatively simple and inexpensive to manufacture, assemble and utilize.

Other objects reside in the combination of elements, arrangements of parts and features of construction of the cutting head disclosed in the accompanying drawing, more fully pointed out in the specification and set forth in the appended claims.

In the drawings, wherein like reference numerals indicate similar parts throughout the several views.

Figure 1:
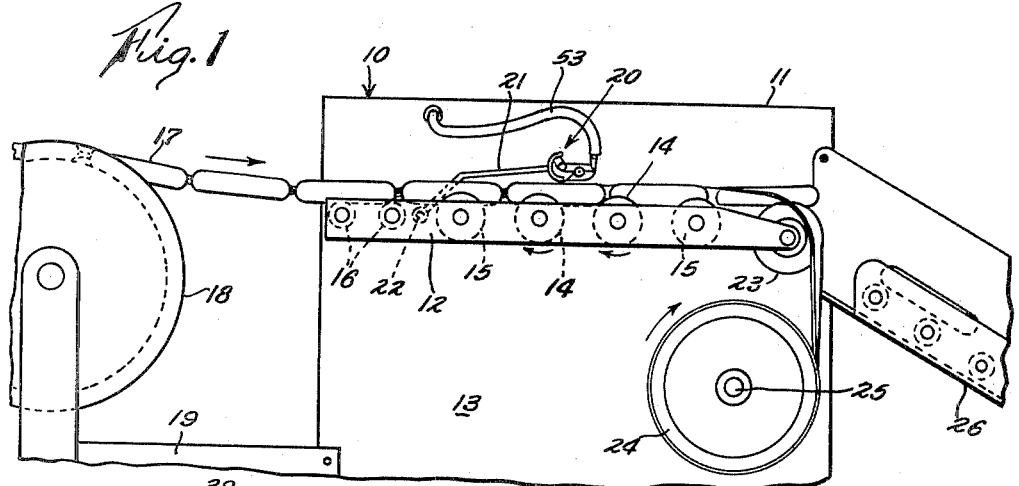
Fig. 1 is a fragmental, side elevational view showing the usual sausage peeling machine with our cutting head disposed thereon in operative cutting position.

Referring now to the drawings the numeral 10 generally indicates a sausage peeling machine of usual construction, said machine comprising a water tight, box-like case 11 for housing the motor and power transmission gearing for driving the various rollers described hereinafter. An elongated bar 12 is mounted on the side wall 13 of the case in spaced relation therewith, and with the wall journals a pair of grooved drive rollers 14—14, a number of grooved free rollers 15 and one or more cylindrical rollers 16. A string of individual frankfurters 17 enclosed in a continuous, hollow case made of a cellulose material, or the like, is introduced onto the machine rollers from a grooved lead wheel 18 rotatably supported in a bracket 19 fixed to the forward side of the machine. The device of the instant invention is a cutting head generally indicated by the numeral 20 which is affixed to the upper end of an arm 21 pivotally mounted at its lower end to a cross pin 22 anchored in the side wall 13 aprroximately at the level of the journals for the pulleys 14, 15 and 16. The cutting head is adapted to ride upon the string of frankfurters moved through the machine upon the free and the driven rollers and to form a continuous slit through the foreign casing around the frankfurters as the line moves under the head. The lateral side portions of the casing so slit are opened out by a convex pulley 23 journaled between the bar 12 and the case side wall 13 at the terminal end of the machine. The opened out casing is led downwardly and then around a reel or drum 24 fixed to a drive shaft 25 suitably journaled in the case side wall 13. The leading end of the foreign casing is initially wound around the reel 24 and as this reel has the same surface speed as the drive rollers 14—14 the wheel winds the entire slit casing onto its periphery whilst maintaining the casing in tension around the convex pulley 23 to thus free each individual frankfurther from the case and deposit it upon a conveyor 25. The sausage peeling machine heretofore described is conventional and forms merely a setting for our present invention.

With reference to Figs. 2–5 of the drawing our cutting head consists of a laterally extending, cylindrical body member 27 which is provided at its inner end with a radial bore 28 for receiving the free end of the pivoted arm 21, the body member being fixed to the arm by a set screw 29. A sleeve 30 is rotatably mounted on the end of the body member 27 in axial alignment therewith by means of a bolt 31 passed through the sleeve and threaded at its inner end to a tapped bore 32 formed in the member. A rearwardly extending plate 33 is fixed to the sleeve and to this end the said plate may have a forward portion provided with a centrally located hole 34 (Fig. 3) which receives the sleeve, said portion being welded or brazed to an annular shoulder 35 formed integrally on an intermediate portion of the sleeve.

Figure 2:
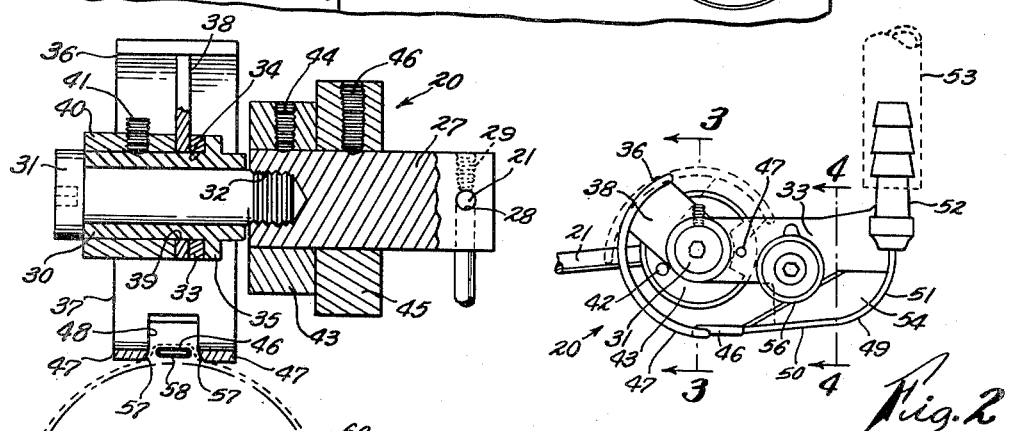
Fig. 2 is an enlarged side elevational view of our cutting head.
Figure 3:
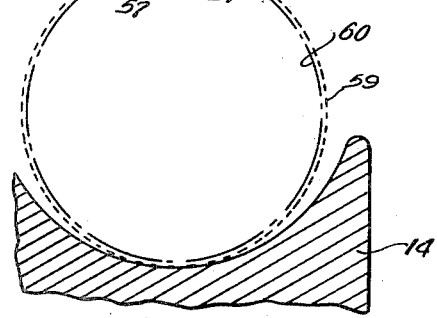
Fig. 3 is an enlarged section taken on line 3—3 of Fig. 2, depicting a section of the sausage being operated on by the head.
Figure 5:
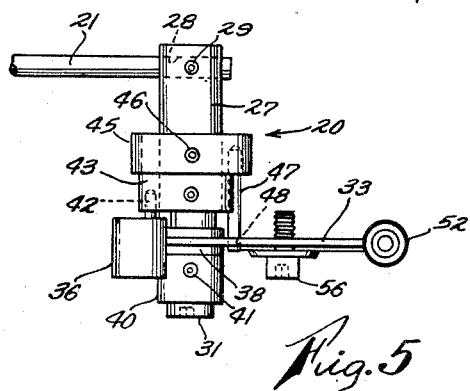
Fig. 5 is a top plan view of the cutting head as it is shown in Fig. 2.

The sleeve 30 also carries a follower that takes the form of a skid 36 in engagement with the uppermost surface portion of the string of frankfurters. The skid supports the cutting head mechanisms in proper relationship with respect to the contour of the string as it moves through the machine beneath the pivoted cutting head. This skid is relatively wide, is preferably semi-circular in side elevation and has a rearwardly extending portion 37 at its lower end. Preferably this skid is rotatably mounted on the sleeve by means of an arm 38 fixed to the inside face of the skid and provided at its inner end with an annular hole 39 through which the sleeve 30 passes, the arm being held against lateral movement by a mounting ring 40 fixed to the sleeve 30 by a set screw 41. As best shown in Fig. 2 the skid member is held against counterclockwise movement beyond the operative position illustrated therein by means of a stop pin 42 projecting laterally from a hub 43 in turn secured for angular adjustment to the body member 27 by a set screw 44. The plate 33 is adjustably mounted on the body member 27 so that it may be horizontally disposed relative to the upper surfaces of lines of sausages having various diameters by means of a hub 45 rotatable on the body member and fixed thereto in selected angular positions by a set screw 46. The hub 45 carries a lateral pin 47 which projects through an opening 48 formed through the plate 33. It will therefore be understood that the plate 33 and the skid member 36 may be adjusted by their respective hubs 43 and 45, to accommodate the machine for operation upon sausages having different diameters.

Figure 4:
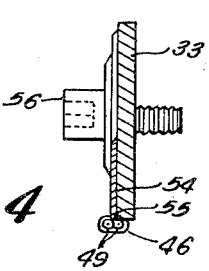
Fig. 4 is a section taken on line 4—4 of Fig. 2.

An air blast is introduced between the foreign casing and the individual frankfurter prior to the cutting step to separate the casing from the frankfurter, said air blast being provided by an extremely small, flat nozzle 46 located between a pair of laterally spaced apart foot portions 47—47 formed in the lower end 37 of the follower by a centrally located slot 48 opening into the rear edge of the follower body. Air under pressure is introduced to the nozzle 46 through a pair of extremely small tubes 49—49 which are brazed together and to one side of the rear edge of the plate 33. As best shown in Fig. 2 the tubes have an upwardly inclined, straight portion 50 disposed at an angle of approximately 4° with the horizontal, said straight portion terminating in a rearward curved portion 51 which terminates at its upper end in an air hose connection 52. The rearwardly extending and upwardly inclined straight portion 50 of the tubes is adapted to preclude the possibility of the tubes scraping along the top portion of the frankfurter bodies after the casing is slit and the bodies have been relieved of the slight downward pressure of the slitting head. The numeral 53 indicates a flexible air hose that is connected to a suitable source of air under pressure. With reference to Fig. 4 a cutting knife 54 has its lower edge disposed in a groove 55 formed by the tubes 49, said knife being removably mounted against the plate 33 by the set screw and washer arrangement 55 threaded in the plate and bearing against the upper portion of the knife.

With reference to Fig. 2 it will be seen that the flat nozzle 46 is directed forwardly and has its forward end portion disposed between the laterally spaced apart foot members 47—47 of the skid member. Further with reference to Fig. 3 it is to be noted that the lower adjacent edges of the foot members are rounded at 57—57 and the bottom face 58 of the flat nozzle is spaced above the plane of the bottom surfaces of the foot members. Thus at a point just in advance of the cutting knife 54 the foreign casing 59 is raised away from each individual frankfurter body 60 by the flat nozzle 46, the rounded inner edges 47 and the bottoms of the foot members on the skid positively holding the nozzle away from progressive portions of the frankfurter body as it advances past the head by their sliding contact with the outer face of the foreign casing on each side of the nozzle.

Thus it will be seen that the foot members on the skid for our cutting head straddle the air blast nozzle and the cutting knife follows the foot members in a very close proximate position. These positions of the said cutting head parts in addition to the heightwise displacement of the air blast nozzle above the running surface of the skid feet produces a positive cutting action that is reliable under all working conditions and insures a complete cut through every line of frankfurters processed on the machine regardless of the consistency of the foreign casing or the irregularity in the uppermost contour of the line of frankfurters.

The operation of the machine will now be briefly described so that the present invention will be fully understood. The leading end of the foreign casing for a line of frankfurters, some forty feet long, is first pierced and the air blast nozzle is then manually slid between the uppermost portion of the casing and the frankfurter body, it being noted that this may be most conveniently effected by manually raising the skid 36 to the position indicated in dotted lines in Fig. 2. The leading end of the slit casing is then led manually over the convex roller 23 and around the driven reel or drum 24 where it is progressively wound thereon thus pulling the casing under the cutting head 20 to continuously slit the foreign casing from one end to the other. Individual frankfurters are forced out of the casing by the convex wheel 23 and move down a conveyor 26. The foreign casing wrapped on the reel 24 can be removed by cutting the layers through with a knife.

What is claimed is:

1. In combination with an airblast plow and cutter member for removing casings from a string of link sausages, said plow having a leading terminal portion, a follower rotatably mounted on said member, said follower having two laterally spaced apart depending bearing portions, said follower being rotatable between an operating position in which the follower is positioned closely in advance of the terminal portion of the plow and the bearing portions project rearwardly and lie on opposite sides of and in substantially the same horizontal plane as that of the plow and a raised position thereabove, said follower having a slot formed between said bearing portions in substantially the same vertical plane as the terminal portion of the plow, whereby air from said plow and cutter member may pass along a string of sausages beyond said follower from between the said bearing portions.

2. In combination with an airblast plow and cutter member for removing casings from a string of link sausages, said plow having a leading terminal portion, a follower rotatably mounted on said member, said follower having two laterally spaced apart depending bearing portions, said follower being rotatable between an operating position in which the follower is positioned closely in advance of the terminal portion of the plow and the bearing portions project rearwardly and lie on opposite sides of and in substantially the same horizontal plane as that of the plow and a raised position thereabove, a stop mounted on the member and engageable by the follower when in operating position, said follower having a slot formed between said bearing portions in substantially the same vertical plane as the terminal portion of the plow, whereby air from said plow and cutter member may pass along a string of sausages beyond said follower from between the said bearing portions.

References Cited in the file of this patent

UNITED STATES PATENTS

| 2,424,346 | Wilcoxon | July 22, 1947 |
| 2,623,237 | Schaller | Dec. 30, 1952 |
| 2,630,598 | Grey | Mar. 10, 1953 |
| 2,686,927 | Grey | Aug. 24, 1954 |